(12) United States Patent
Aruga

(10) Patent No.: US 11,124,278 B2
(45) Date of Patent: Sep. 21, 2021

(54) LIFE JACKET CASE AND AIRCRAFT

(71) Applicant: MITSUBISHI AIRCRAFT CORPORATION, Aichi (JP)

(72) Inventor: Hiroyasu Aruga, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 527 days.

(21) Appl. No.: 14/446,953

(22) Filed: Jul. 30, 2014

(65) Prior Publication Data
US 2015/0034641 A1 Feb. 5, 2015

(30) Foreign Application Priority Data

Aug. 2, 2013 (JP) .............................. JP2013-161038

(51) Int. Cl.
*B63C 9/22* (2006.01)
*B64D 11/06* (2006.01)
*B65D 25/38* (2006.01)

(52) U.S. Cl.
CPC ............ *B63C 9/22* (2013.01); *B64D 11/0631* (2014.12); *B65D 25/38* (2013.01); *Y02T 50/40* (2013.01)

(58) Field of Classification Search
CPC .. B63C 9/22; B63C 9/23; B65D 25/38; B65D 33/34; B64D 2011/0672; B64D 11/0631; B64D 11/06; B64D 25/18; B64D 11/0629; B64D 25/00; B64D 11/0636; Y02T 50/46; Y10T 70/504; A45C 2001/003
USPC ..................... 220/214; 224/275; 297/188.08; 383/86.1, 46, 57, 86.2, 905, 90–91, 5, 383/205, 79, 92, 98, 99, 30, 89; 150/123
See application file for complete search history.

(56) References Cited

U.S. PATENT DOCUMENTS

| | | | | |
|---|---|---|---|---|
| 829,087 A | * | 8/1906 | Rice ..................... | B65D 77/185 70/65 |
| 1,236,159 A | * | 8/1917 | Gatlin .................... | B65D 31/02 383/85 |
| 4,783,978 A | * | 11/1988 | Vallerga ................... | A45C 1/00 150/123 |
| 7,077,466 B2 | | 7/2006 | Forstner et al. | |

(Continued)

FOREIGN PATENT DOCUMENTS

| | | | | |
|---|---|---|---|---|
| GB | 2492813 A | * | 1/2013 | ............... B63C 9/23 |
| JP | H09-65929 A | | 3/1997 | |

(Continued)

OTHER PUBLICATIONS

FR 1457519 Office action dated Feb. 10, 2017.
Japanese Office Action issued in Patent Application No. JP-2013-161038 dated Mar. 28, 2017.

*Primary Examiner* — Nathan J Newhouse
*Assistant Examiner* — Matthew T Theis
(74) *Attorney, Agent, or Firm* — Pearne & Gordon LLP

(57) ABSTRACT

The present invention provides a life jacket case which can achieve weight reduction as well as seal the inside. Provided is a life jacket case for housing a life jacket, wherein a cover of an opening, through which the life jacket is taken in and out, is made of a first material which is hard enough to keep the shape of the cover, and a region other than or larger than the region made of the first material is made of a second material which is more lightweight than the first material. It is preferable that the life jacket case is fitted with a security tag which indicates whether or not the cover has been opened.

19 Claims, 14 Drawing Sheets

(56) References Cited

U.S. PATENT DOCUMENTS

| | | | |
|---|---|---|---|
| 2007/0232164 A1 | 10/2007 | Swan et al. | |
| 2008/0257673 A1* | 10/2008 | Mrocki | G09F 3/037 190/101 |
| 2009/0242695 A1 | 10/2009 | Lamoree | |
| 2012/0243809 A1* | 9/2012 | McSweeney | B65D 33/30 383/207 |
| 2013/0307671 A1* | 11/2013 | Hino | G06K 7/10366 340/6.1 |

FOREIGN PATENT DOCUMENTS

| | | |
|---|---|---|
| JP | 4945562 B2 | 6/2012 |
| WO | 2008057617 A2 | 5/2008 |

\* cited by examiner

LIFE JACKET CASE AND AIRCRAFT

BACKGROUND OF THE INVENTION

Field of the Invention

The present invention relates to a life jacket case installed in an aircraft and the like, and to an aircraft.

Description of the Related Art

Aircraft seats are each provided with a life jacket. The life jacket is commonly housed in a case which is mounted under the seat surface.

The life jacket case is roughly classified into two types: one is a resin-molded hard type, and the other is a soft type made of a flexible material such as cloth.

The hard type has, like Japanese Patent No. 4945562, for example, a box-like main body and a cover for opening and closing an opening of the main body, and both the main body and the cover are a resin-molded article.

The soft type is, like U.S. Pat. No. 7,077,466, for example, formed in a bag-like shape, and the opening of the bag is opened and closed by means of a hook-and-loop fastener, etc.

Compared with the soft type, the injection-molded hard type like Japanese Patent No. 4945562 is larger in plate thickness and heavier in weight. This makes it unfavorable for use as an aircraft life jacket case, of which weight reduction is highly desired.

Although lightweight, the soft type like U.S. Pat. No. 7,077,466 sags under its own weight, which creates a gap at the corner of the peripheral edge of the opening, etc., so that, unlike the hard type which can keep the shapes of the peripheral edge of the opening of the main body and the cover, the soft type cannot seal the inside. In the soft type, the life jacket may be damaged by a foreign object inserted through the gap at the peripheral edge of the opening.

In view of this, the present invention aims to provide a life jacket case which can achieve weight reduction as well as seal the inside.

SUMMARY OF THE INVENTION

The present invention provides a life jacket case for housing a life jacket, wherein a cover of an opening, through which the life jacket is taken in and out, is made of a first material which is hard enough to keep the shape of the cover, and a region other than or larger than the region made of the first material is made of a second material which is more lightweight than the first material.

It is preferable that the life jacket case of the present invention is fitted with a security tag which indicates whether or not the cover has been opened.

In the life jacket case of the present invention, it is preferable that the cover is formed of two or more folding pieces which are folded inward from a part on the rear side of the peripheral edge of the opening, and that the opening is closed by at least two of the folding pieces being overlapped.

In the life jacket case of the present invention, it is preferable that the cover is formed of the folding pieces, which are folded from four sides, into a rectangular shape.

In the life jacket case of the present invention, it is preferable that the life jacket case includes a tag fitting part on which the security tag is fitted, and that the tag fitting part is provided in the folding piece of the multiple folding pieces which is located on the rearmost side, and passes through the other folding pieces to protrude forward, and that the security tag is fitted on the portion of the tag fitting part which protrudes from the folding piece.

It is preferable that expanding the folding pieces allows the life jacket case of the present invention to be folded up flat.

In the life jacket case of the present invention, a plate material marked with creases for the folding pieces can be used as the first material.

In the life jacket case of the present invention, the second material can be used for a region including the cover, and the first material can be integrated with the second material.

It is preferable that the life jacket case of the present invention includes a pull-out string for pulling the life jacket out of the life jacket case.

It is desirable that the pull-out string includes: a fixed part which is fixed to the life jacket case; a turn-around part which continues to the fixed part and at which the extension direction of the pull-out string is changed inside the life jacket case to a pull-out direction in which the pull-out string is pulled out; and a grip part extending to the outside of the life jacket case.

It is preferable that the life jacket case of the present invention includes a guide part which guides the pull-out string along the pull-out direction between the turn-around part and the grip part.

In the life jacket case of the present invention, a member molded from a resin can be used as the first material, and the first material can also be used for the peripheral edge of the opening.

The life jacket case of the present invention can also be configured such that pulling a string which is provided along the peripheral edge of the opening constricts and closes the opening, and that the cover covers the opening in its closed state.

It is preferable that the life jacket case of the present invention is installed in an aircraft seat or near the aircraft seat.

An aircraft of the present invention includes the above-described life jacket case.

In the present invention, the first material is used for the cover which is important in preventing improper access to the life jacket. Due to the hardness of the first material, the shape of the cover is kept in the closed state, so that the opening of the life jacket case is sealed without a gap. Thus, the life jacket can be protected from improper access through a gap of the opening.

On the other hand, since the first material is generally heavier in weight per unit area compared with the second material, the use of the first material is confined to the region required for closing the opening without a gap, while the lightweight second material is used for the region larger than the region made of the first material.

Thus, according to the life jacket case of the present invention which uses the first material and the second material, it is possible to achieve weight reduction as well as to seal the inside.

BRIEF DESCRIPTION OF THE DRAWINGS

FIG. 11A is a plan view, FIG. 11B is a side view, and FIG. 11C is an expanded view.

DETAILED DESCRIPTION OF THE PREFERRED EMBODIMENTS

In the following, embodiments according to the present invention will be described with reference to the accompanying drawings.

First Embodiment

Figure 1:
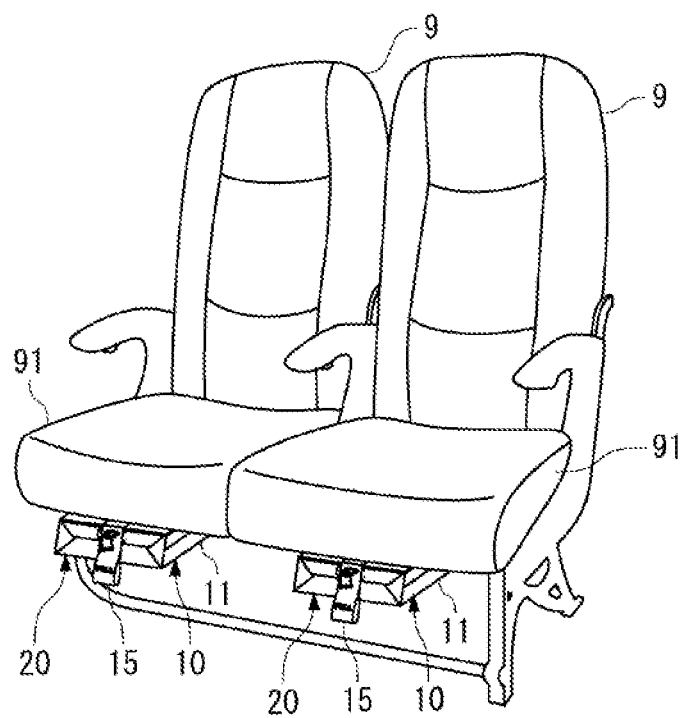
FIG. 1 is a perspective view showing a life jacket case according to a first embodiment installed in an aircraft seat.

A life jacket case 10 is installed under each aircraft seat 9 shown in FIG. 1.

The life jacket case 10 houses a life jacket 8 shown in FIG. 2B.

The life jacket 8 is supposed to be taken out of the case 10 for use only in emergencies. So that the life jacket will not be unavailable in emergencies due to damage, the life jacket 8 is not spread except in emergencies and is housed in the case 10 in its folded state.

It is necessary to protect the life jacket 8 from damage by the life jacket case 10 shown in FIG. 2A.

The life jacket case 10 is formed in a size suitable for the folded life jacket 8. When housing the life jacket 8, the life jacket case 10 assumes a substantially rectangular parallelepiped shape following the shape of the life jacket 8.

Figure 3:
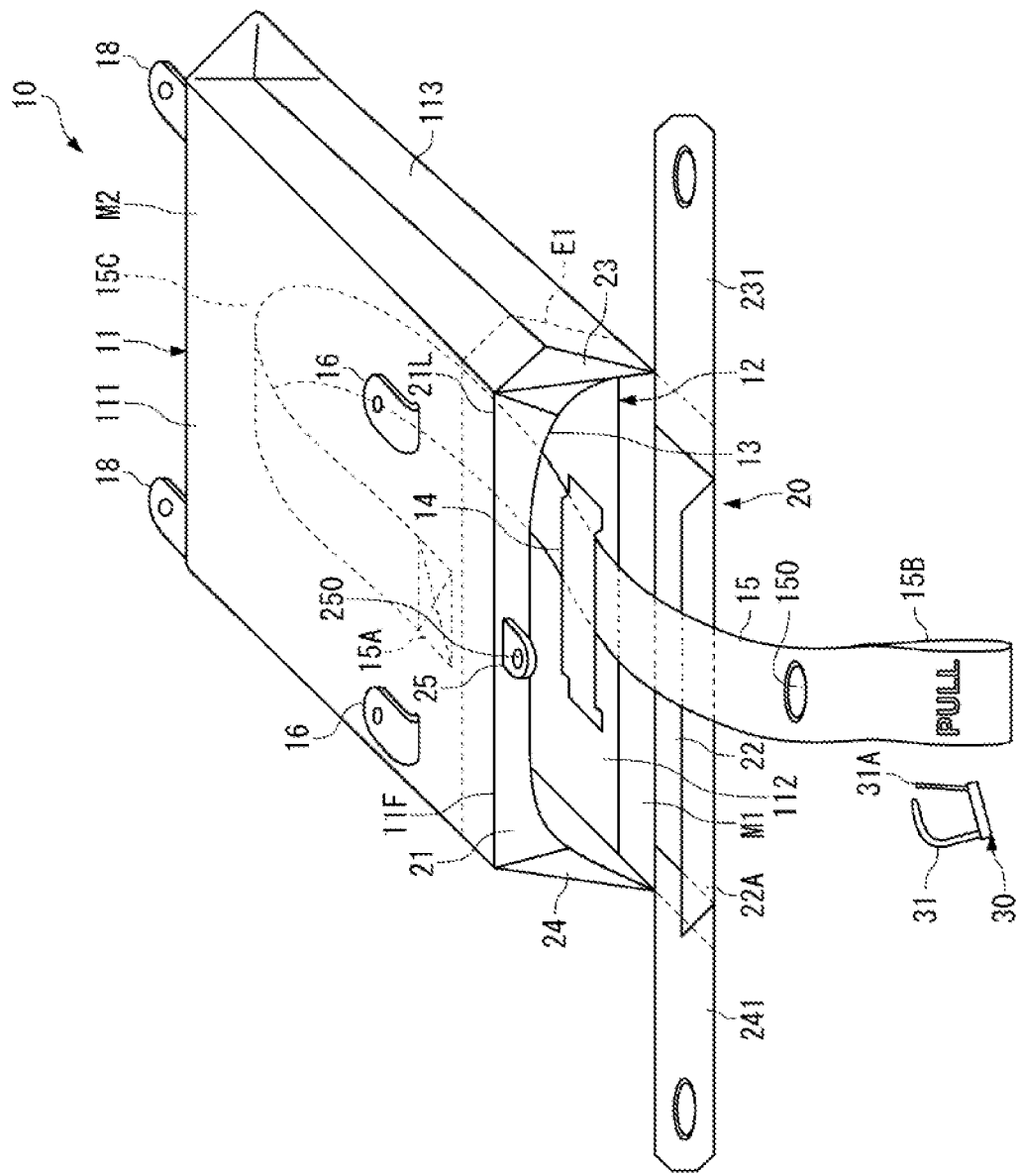
FIG. 3 is a perspective view showing the life jacket case in its opened state.

The life jacket 8 is taken in and out through an opening 12 of the life jacket case 10 shown in FIG. 3.

As shown in FIG. 2A, the life jacket case 10 has a main body 11 surrounding the life jacket 8 except for one side of the substantially rectangular parallelepiped shape, and a cover 20 located at the remaining one side. The main body 11 and the cover 20 are formed integrally.

The life jacket case 10 is installed on the back side of a seat surface 91 of the seat 9 with the cover 20 facing forward which is the travelling direction of the aircraft.

In this description, the "front" relative to the life jacket case means the side of the cover 20, while the "rear" relative to the life jacket case means the side opposite to the cover 20. Except for the life jacket cases installed in some seats which face the direction opposite to the travelling direction of the aircraft, the "rear" and the "front" of the life jacket case 10 correspond respectively to the "rear" and the "front" in the travelling direction of the aircraft.

The life jacket case 10 uses a hard material M1 which is hard enough to keep its shape on its own, and a soft material M2 which is more flexible and lightweight than the hard material M1.

Figure 6:
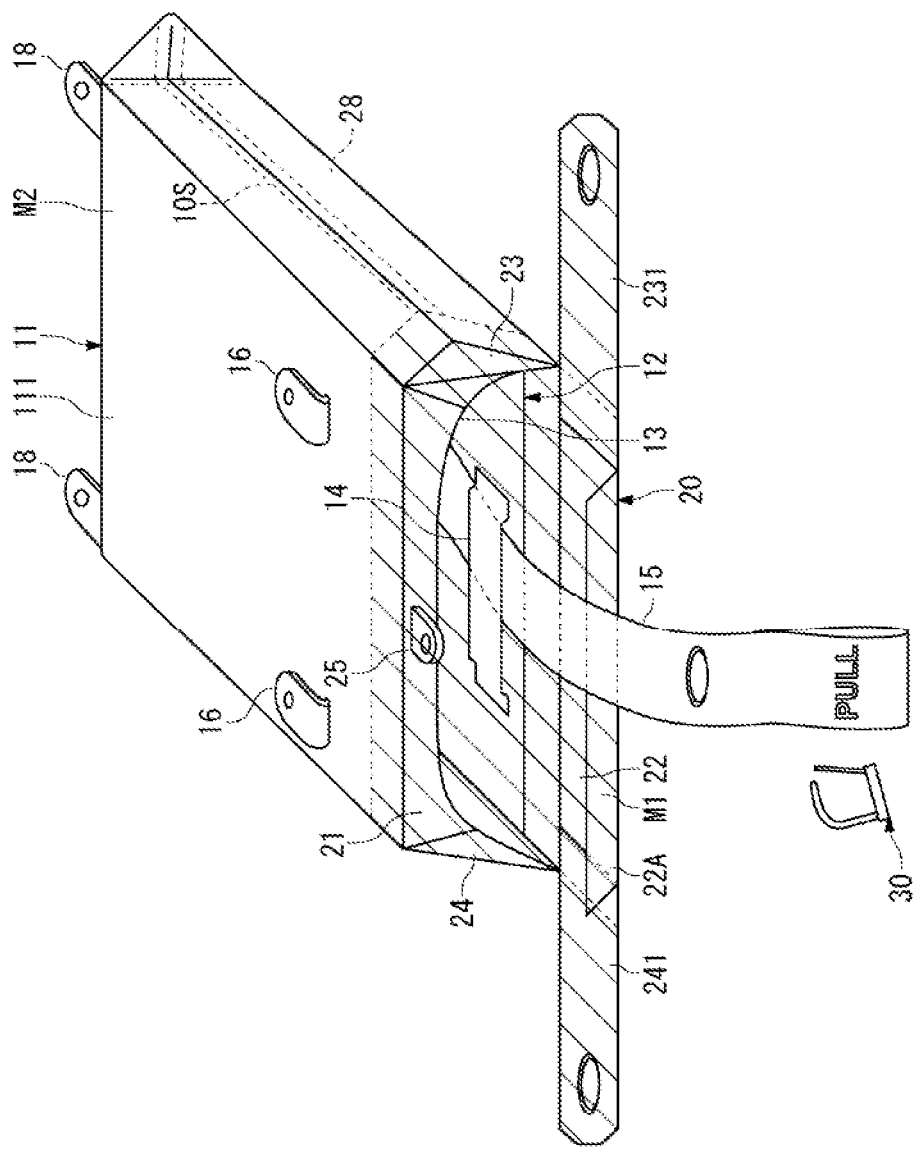
FIG. 6 is a view showing a modified example of the first embodiment.

The soft material M2 is used across the entire surface region of the life jacket case 10, while the hard material M1 is used for a part of the region of the life jacket case 10. FIG. 6 shows the region made of the hard material M1 indicated by hatching.

The hard material M1 is a plate material formed of a synthetic resin. The plate thickness is, for example, approximately 0.5 mm to 2 mm.

The soft material M2 is cloth, non-woven fabric, leather, synthetic leather, or the like.

Both the hard material M1 and the soft material M2 are easily available commercial products which can be used for various applications.

A flame-retardant resin such as an acrylic resin or a vinyl chloride resin which is used as an aircraft interior material can be preferably used as the hard material M1. In addition, aromatic type polyamide or polycarbonate can also be suitably used. Example products which can be adopted as the hard material M1 include: "Boltaron" using polyvinyl chloride (BOLTARON Inc.); "KYDEX" using acrylic-modified polyvinyl chloride (Sekisui Seikei, Ltd.); "KYDAC" using a polyvinyl chloride resin (Sumitomo Bakelite Co., Ltd.); and "ULTEM" using a polyetherimide (PEI) resin (Saudi Basic Industries Corporation (SABIC)).

Other than the above-named resins, lightweight metals such as aluminum and aluminum alloy or magnesium alloy, or fiber-reinforced resins such as FRP and CFRP can also be used as the hard material M1.

It is preferable that the soft material M2 is subjected to flame-retardant treatment such as flame-retardant resin coating or interweaving of flame-retardant fiber.

The soft material M2 is cut into pieces of a required size, and the pieces are sewn together so that the seam allowance appears inside the case 10. The hard material M1 is integrally stacked on the back surface (inner surface) of the soft material M2.

The main body 11 has an upper part 111 facing the back side of the seat surface 91; a lower part 112 (FIG. 5) facing the upper part 111; a left part 113 and a right part 114 located on the left and right sides of the travelling direction; and a rear part 115 (FIG. 5) located on the rear side in the travelling direction.

As shown in FIG. 3, the main body 11 is provided with a pull-out string 15 for pulling out the life jacket 8. A fabric tape or the like can be used as the pull-out string 15. A fixed end 15A, which is one end of the pull-out string 15, is sewn and fixed on the inner surface of the upper part 111 of the main body 11. The fixed end 15A is located at the center in the horizontal direction, near the front end of the upper part 111.

The pull-out string 15, which continues to the fixed end 15A and changes its extension direction inside the case 10 to the pull-out direction (direction from the rear side toward the front side) in which the pull-out string 15 is pulled out, passes between the inner surface of the lower part 112 and a guide part 14 provided on the inner surface of the lower part 112 from the far side inside the case 10 to the near side, and extends to the outside of the case 10. The guide part 14 is formed, for example, by sewing a cut piece of the soft material M2 at left and right ends on the lower part 112. The guide part 14 is located at the center in the horizontal direction, near the front end of the lower part 112 so as to face the fixed end 15A.

However, as opposed to the above, the fixed end 15A may be fixed to the lower part 112 and the guide part 14 may be provided on the upper part 111.

Since the life jacket case 10 includes the pull-out string 15, even when the life jacket 8 having no pull-out string is housed in the case, the life jacket 8 can be smoothly taken out of the life jacket case 10 by means of the pull-out string 15.

The pull-out string 15 is formed with a looped pull-out end 15B to allow easy pulling of the pull-out string 15. A through-hole 150 for inserting a tag fitting part 25 to be described later is formed near the pull-out end 15B.

To mount the life jacket case 10 on the back side of the seat surface 91, mounting protrusions 16 are provided at left and right ends near the front end of the upper part 111 of the main body 11.

Pairs of upper and lower mounting protrusions 18 and (see also FIG. 5) are provided at left and right ends of the rear part 115 of the main body 11.

As shown in FIG. 2A and FIG. 3, the cover 20 for opening and closing the opening 12 of the life jacket case 10 is formed of four folding pieces 21, 22, 23, and 24 which are each folded inward from a part on the rear side of a peripheral edge 13 of the opening 12. The folding pieces 21 to 24 constitute the rectangular cover 20 by being folded inward from four sides.

As shown in FIG. 3, when the folding pieces 21 to 24 are expanded toward the front side, the opening 12 appears at the front end of the life jacket case 10. The folding pieces 21 to 24 are connected with each other, and a folding allowance 27 (FIG. 4) is provided between the adjacent folding pieces. The adjacent folding pieces are overlapped in the folding allowance 27.

The folding pieces 21 to 24 share a cylindrical region from the peripheral edge 13 to a front ridge 11F of the main body 11. The peripheral edge 13 of the opening 12, which is formed by the folding pieces 21 to 24 being expanded, occupies the same region as the folding pieces 21 to 24.

The above-described hard material M1 is used for the region from the peripheral edge 13 to a position slightly beyond the front ridge 11F of the main body 11. An end edge E1 of the hard material M1 located at a position beyond the front ridge 11F is shown in FIG. 3.

The hard material M1 is cut into pieces of a required size and bonded with an adhesive or sewn on the back surface of the soft material M2. The hard material M1 is marked with creases for folding the folding pieces 21 to 24.

In this embodiment, the stack of the hard material M1 and the soft material M2 has flexibility. Therefore, when housing a life jacket which is smaller in width in the horizontal direction or depth from the front side to the rear side and larger in height in the vertical direction than the life jacket 8 which has a width, a depth, and a height which exactly fit the life jacket case 10, the peripheral edge 13 flexibly deforms so that such a life jacket can be housed from the opening 12.

The upper folding piece 21, which is folded from the upper side, covers about a half of the opening 12 in the height direction when folded.

While it is sufficient that the upper folding piece 21 and the lower folding piece 22, which is folded from the lower side, have a size such that the folding pieces overlap, in this embodiment, the lower folding piece 22 extends to a position beyond a crease 21L of the upper folding piece 21. An overlap piece 22A beyond the crease 21L can be bent into an L-shape, and overlaps the upper part 111 of the main body 11. The overlap piece 22A can also be engaged on the upper part 111 by means of a hook-and-loop fastener or the like.

A coupling belt 231, which extends toward the center in the horizontal direction of the case 10 when folded, is sewn on the left folding piece 23 which is folded from the left side. Similarly, a coupling belt 241, which extends toward the center in the horizontal direction of the case 10 when folded, is sewn on the right folding piece 24 which is folded from the right side.

Figure 2:
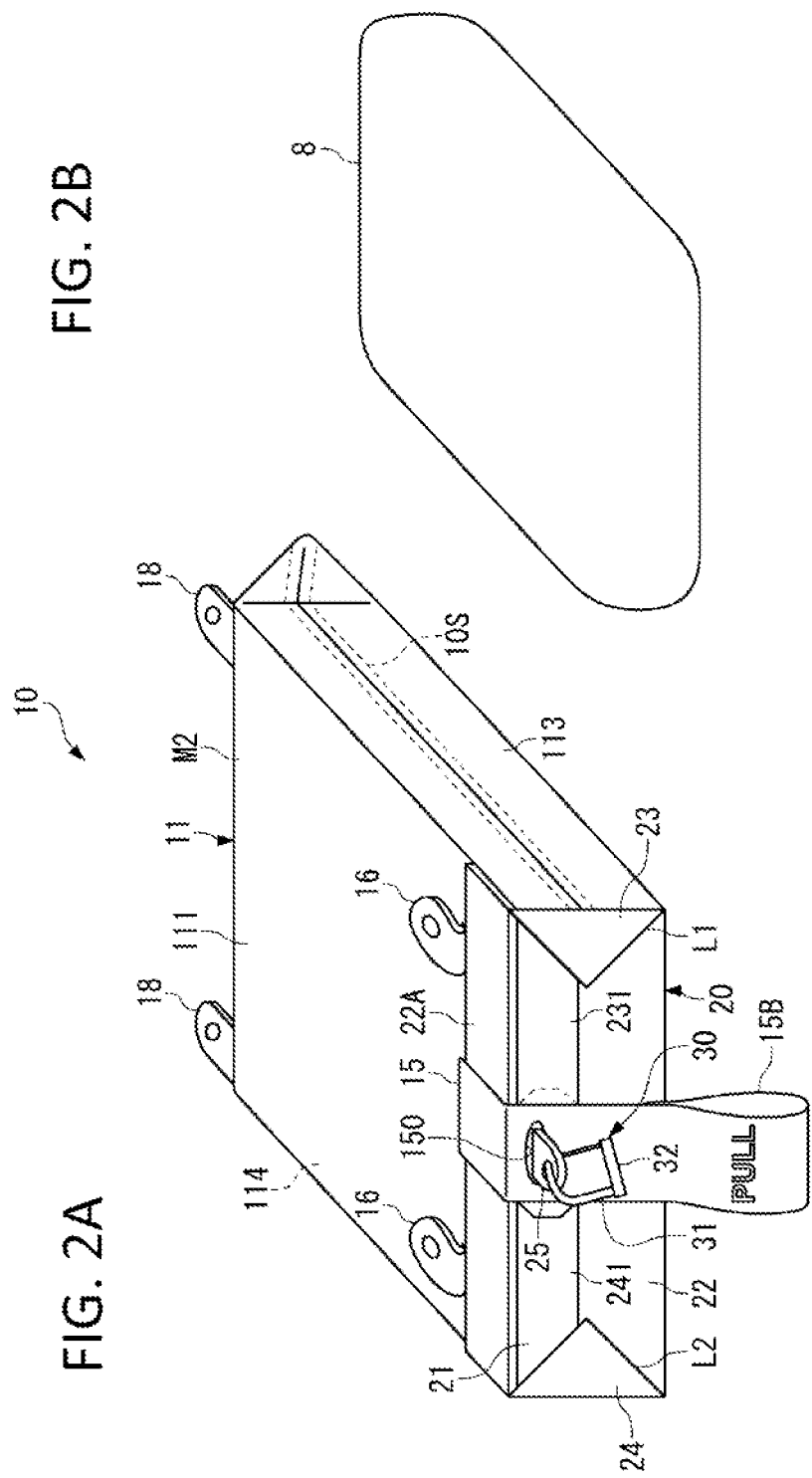
FIG. 2A is a perspective view showing the life jacket case.
FIG. 2B is a perspective view showing the folded life jacket.

As shown in FIG. 2, the upper folding piece 21, the lower folding piece 22, the left folding piece 23, and the right folding piece 24 close the opening 12 by being overlapped. Gaps remaining on the left and right sides when the upper folding piece 21 and the lower folding piece 22 are overlapped are blocked by the left folding piece 23 and the right folding piece 24.

Here, the folding pieces 21 to 24 made of the hard material M1 are folded at predetermined positions and keep their shapes without loosening. Thus, the folding pieces 21 to 24 are maintained in their overlapped state, so that no gap is created among the folding pieces 21 to 24. Even pressing near the joint of the folding pieces 21 to 24 does not cause a gap through which a foreign object such as a writing instrument or a tool can be inserted. The inside of the life jacket case 10 is sealed with the opening 12 being entirely blocked in this way.

Figure 4:
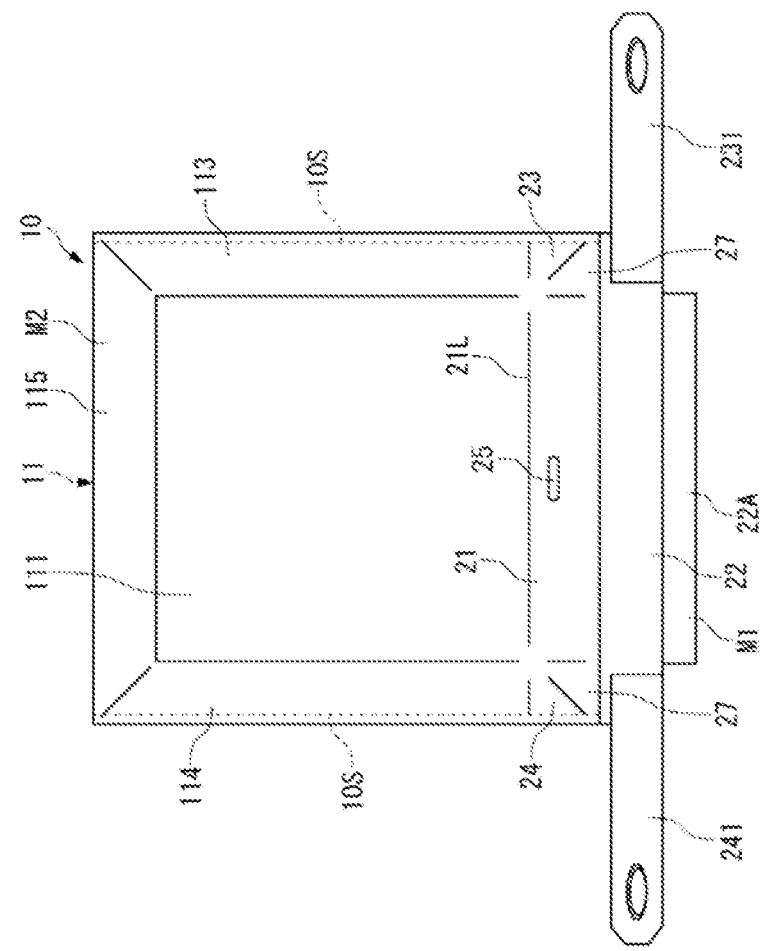
FIG. 4 is a plan view showing the life jacket case in its state of being folded up flat.

As shown in FIG. 4, expanding the folding pieces 21 to 24 forward allows the life jacket case 10 to be folded up. In FIG. 4, the pull-out string 15 and the mounting protrusions 16 and 18 are not shown.

When folded up, the life jacket case 10 looks like a flat bag. Thus, the life jacket case 10 does not require a large space for keeping in stock and is convenient for transport due to its compactness.

Although the life jacket case 10 of this embodiment is folded up along seam allowances 10S provided on the left and right sides, the position of the seam allowance 10S can be arbitrarily determined, and the seam allowance 10S and the position of the crease for folding up the case do not necessarily correspond to each other.

As shown in FIG. 3, the pull-out end 15B of the pull-out string 15 is extended to the outside of the life jacket case 10 when placing the life jacket 8 inside the life jacket case 10. At this point, the pull-out string 15 is not loosened too much on the far side inside the case 10, but the position of a turn-around part 15C of the pull-out string 15 is confined to the middle of the fixed end 15A or the guide part 14 and the rear part 115.

When the life jacket 8 is placed inside the case 10, the turn-around part 15C of the pull-out string 15 is pushed by the life jacket 8, which causes the pull-out string 15 to be pulled to the far side inside the case 10. At this point, as the pull-out string 15 is pulled into the case while being guided at the center in the horizontal direction along the front-rear direction by the guide part 14, the pull-out string 15 is set between the outer periphery of the life jacket 8 and the inner surface of the case 10 without straying from the outer periphery of the life jacket 8.

Also when the life jacket 8 is pulled out of the life jacket case 10, the pull-out string 15 is guided along the front-rear direction by the guide part 14, so that the life jacket 8 can be reliably pulled out of the life jacket case 10.

Next, the configuration of a security tag 30 and the tag fitting part 25 will be described.

The life jacket case 10 includes the tag fitting part 25, on which the security tag 30 is fitted, at the center in the width direction of the case 10 where the coupling belt 231, the coupling belt 241, the upper folding piece 21, and the lower folding piece 22 overlap.

The tag fitting part 25 is a general-purpose part formed of a resin or metal, and provided on the upper folding piece 21. The tag fitting part 25 is inserted from the back side into a through-hole formed in the upper folding piece 21, and is fixed on the back surface of the upper folding piece 21. The tag fitting part 25 protruding forward from the upper folding piece 21 protrudes forward from the folding pieces 21 to 24 in its state of being passed through through-holes formed in each of the lower folding piece 22 and the coupling belts 231 and 241. An insertion hole 250 (FIG. 3) for inserting the security tag 30 is formed at the leading end of the tag fitting part 25.

The security tag 30 has a hook part 31 which has a U-shape before being disengaged, and a lock part 32 for engaging the hook part 31. One end of the hook part 31 continues to the lock part 32. Inserting the hook part 31 into the insertion hole 250 of the tag fitting part 25 and then fitting the other end of the hook part 31 into a hole of the lock part 32 fits the security tag 30 on the tag fitting part 25.

The hook part 31 is configured such that one corner 31A (FIG. 3) snaps when the hook part 31 is pulled with a force equal to or larger than a predetermined force. When the one corner 31A of the hook part 31 snaps and the security tag 30 is disengaged from the tag fitting part 25, the cover 20 can be opened.

There is another type of the security tag 30, which is disengaged from the tag fitting part 25 as the other end of the hook part 31 is pulled out of the hole of the lock part 32 when the security tag 30 is pulled with a force equal to or larger than a predetermined force.

When the security tag 30 is fitted on the leading end of the tag fitting part 25, the folding pieces 21 to 24 are engaged with each other at a position of the tag fitting part 25.

Here, it is preferable that the tag fitting part 25 is provided at a position near the upper part 111 of the main body 11. This way, the lower folding piece 22 is engaged near the upper end by the security tag 30 fitted on the tag fitting part 25, so that, compared with the case where the lower folding piece 22 is engaged at a position at the center in the height direction or a lower position of the case 10, lifting of the lower folding piece 22 relative to the upper folding piece 21 can be suppressed.

In addition to engaging the folding pieces 21 to 24 as described above, the tag fitting part 25 and the security tag 30 have also a role of engaging the pull-out string 15. The security tag 30 is fitted on the leading end of the tag fitting part 25 which is passed through the through-hole 150 of the pull-out string 15.

Fitting the security tag 30 on the tag fitting part 25 engages the folding pieces 21 to 24 with each other, so that the cover 20 cannot be opened unless the security tag 30 is disengaged from the tag fitting part 25. Forcibly expanding the joint of the folding pieces 21 to 24 would disengage the security tag 30.

Thus, the security tag 30 indicates whether or not the cover 20 has been opened. If the security tag 30 is disengaged from the tag fitting part 25, it means that the cover 20 has been opened once even if it is closed now, and if the security tag 30 is fitted on the tag fitting part 25, it means that the cover 20 has not been opened. Whether the cover 20 has been opened and the life jacket 8 has become accessible can be known from the state of the security tag 30. When the life jacket 8 becomes accessible, the life jacket 8 may be damaged or stolen. Therefore, if the security tag 30 indicates that the life jacket 8 has become accessible, the life jacket 8 is replaced or refurnished.

Figure 5:
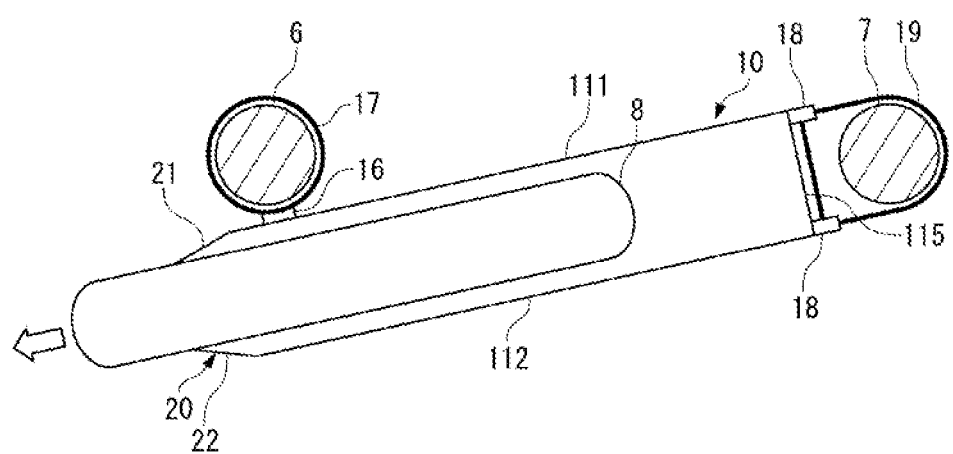
FIG. 5 is a schematic view showing the life jacket case mounted under the seat.

As shown in FIG. 5, the life jacket case 10 is mounted on bars 6 and 7 provided on the back side of the seat surface 91.

The bar 6 is installed on the front side of the seat surface 91, while the bar 7 is installed on the rear side of the seat surface 91. Both the bars 6 and 7 extend in the horizontal direction of the seat surface 91.

The life jacket case 10 is mounted on the bar 6 by means of a binding band 17 which is passed through a hole of the mounting protrusion 16 of the upper part 111.

In addition, the life jacket case 10 is mounted on the bar 7 by means of a binding band 19 which is passed through holes of the mounting protrusions 18 and 18 at the upper and lower ends of the rear part 115.

The life jacket case 10 is mounted at a tilt in the horizontal direction by the mounting protrusions 16 and the mounting protrusions 18 such that the cover 20 positioned at the front side is on the lower side and the rear part 115 is on the upper side.

The mounting protrusions 16 and the mounting protrusions 18 can be mounted on various members provided on the back side of the seat surface 91 other than the bars 6 and 7.

In some cases, the life jacket case 10 is mounted in its standing state with the opening 12 facing upward on the front side of the seat surface 91. In this case, the life jacket case 10 can be bound or mounted on a bar which is located on the front side of the seat surface 91 and stops movement of a piece of luggage placed on the floor, and on a bar provided on the back side of the seat surface 91. The member for supporting the life jacket case 10 is not limited to a bar, but the life jacket case 10 can be mounted on any appropriate member.

A mounting member can be provided at an appropriate position of the life jacket case 10 according to the posture of the life jacket case 10 when the life jacket case 10 is installed in the seat 9 or around the seat 9 and to the position of the support member.

The life jacket case 10 having the configuration described above is installed in the seat 9 with the security tag 30 fitted as shown in FIG. 2A. The cover 20 of the life jacket case 10 faces the front side of the seat 9.

At this point, the cover 20 is sealed without a gap by the overlapped folding pieces 21 to 24. Therefore, insertion of a foreign object such as a writing instrument or a tool into the case 10 can be blocked, so that damage to the life jacket 8 due to insertion of the foreign object can be prevented.

In addition, if the security tag 30 is disengaged from the tag fitting part 25, it can be determined that the cover 20 has been opened. Thus, the life jacket 8 housed inside the case 10 with the disengaged security tag 30 can be replaced or the stolen life jacket 8 can be refurnished during a preflight inspection.

In the event of an emergency, a passenger sitting on the seat 9 bends down and grips the pull-out end 15B of the pull-out string 15 of the life jacket case 10 installed at his/her seat and pulls it forward. Then, as the pull-out string 15 is disengaged from the tag fitting part 25, the one corner 31A of the hook part 31 of the security tag 30 snaps. When the security tag 30 is disengaged from the tag fitting part 25, the cover 20 is pushed open from the inside by the life jacket 8 following the pull-out string 15, so that the life jacket 8 is taken out of the case 10.

That is, without the need for two operations, namely, opening the cover 20 and then taking out the life jacket 8, the life jacket 8 can be taken out easily and quickly by one action of just pulling the pull-out string 15.

Here, since the life jacket case 10 is disposed at a tilt in the horizontal direction, the life jacket 8 moves to the front side of the case 10 (the side of the opening 12), which also contributes to easy and quick taking out of the life jacket 8.

Now, as described above, the life jacket case 10 of this embodiment uses the hard material M1 for sealing the opening 12 without a gap.

The cover 20 of the case 10, from which the life jacket 8 is taken out, is supposed to be opened in emergencies to take out the life jacket 8. The cover 20 is located on the front side of the seat 9 so that the life jacket 8 can be taken out smoothly. Therefore, when trying to access the life jacket 8 inside the case 10, one would first touch the cover 20 and try to open it. If closure by the cover 20 is insufficient and there is a gap at the corner of the peripheral edge 13, etc., the life jacket 8 inside would be easily accessible through the gap. Thus, it is important to seal the opening 12 by the cover 20 without a gap.

For this purpose, the hard material M1 is used for the cover 20. Since the hard material M1 keeps a constant shape of the folded folding pieces 21 to 24 due to the hardness of the material, no gap for allowing insertion of a foreign object is created among the folding pieces 21 to 24.

In addition, since the folding pieces 21 to 24 are engaged near the upper end by the tag fitting part 25 and the security tag 30, lifting of the lower folding piece 22 relative to the upper folding piece 21 is prevented. Thus, the cover 20 can be more reliably closed.

Moreover, since the upper end of the lower folding piece 22 extends to the upper part 111 of the main body 11, there is no joint between the lower folding piece 22 and the upper folding piece 21 on the front surface of the case 10 in which improper access is likely to be attempted. Thus, there is a lower risk of the joint of the folding pieces 21 to 24 being pried out.

In this embodiment, the folding pieces 21 to 24 are connected with each other and the folding allowance 27 (FIG. 4) is provided between the adjacent folding pieces. Therefore, even when one tries to forcibly insert a foreign object through the joint of the adjacent folding pieces, the leading end of the foreign object would hit the folding allowance 27 and cannot be inserted any farther to the inside.

For example, insertion of a foreign object through the joint L1 between the left folding piece 23 and the lower folding piece 22 is blocked by the folding allowance 27 provided between the left folding piece 23 and the lower folding piece 22. The same applies to a joint L2 between the left folding piece 23 and the lower folding piece 22.

Thus, even when a foreign object is forcibly inserted through the joint of the adjacent folding pieces, damage to the life jacket 8 can be prevented.

As described above, using the hard material M1 for the cover 20, which is important in preventing improper access to the life jacket 8, can protect the life jacket 8 from damage.

On the other hand, the hard material M1 is heavier in weight per unit area compared with the soft material M2. Therefore, the use of the hard material M1 is confined to a minimum region required for closing the opening 12 of the case 10 without a gap, while the lightweight soft material M2 is used for the remaining region larger than the cover 20, to thereby achieve weight reduction of the life jacket case 10.

By forming the large part of the life jacket case 10 from the soft material M2, the lightweight life jacket case 10 of, for example, approximately several ten grams to 150 grams can be realized.

In addition, compared with the case where an injection-molded member is used as the main body 11 or the cover 20, the cost of the molding die can be saved by using the soft material M2 which is cloth or synthetic leather, etc. and the hard material M1 which is a plate material. Since the life jacket case 10 is not mass-produced with an order for several ten thousand units or larger, forming the case by sewing and bonding the pieces of material cut into a required size, without involving the cost of the molding die, can keep down the manufacturing cost.

Moreover, a plate material having a smaller plate thickness than the plate thickness which can be molded by injection molding can be selected as the plate material used as the hard material M1 in this embodiment. By selecting a plate material with a minimum thickness for realizing the hardness required for sealing the opening 12 without a gap, the weight of the life jacket case 10 can be further reduced.

It is preferable that a core material is stacked on the soft material M2 so that a sharp object such as a needle cannot easily stick into the material.

Alternatively, it is also preferable that the soft material M2 is densely formed of strong fiber such as aramid fiber.

In a modified example of the first embodiment shown in FIG. 6, a core material 28 is stacked on the back surface of the soft material M2.

Cloth, synthetic leather, resin film, etc. can be used as the core material 28.

The core material 28 is provided across almost the entire main body 11. The core material 28 cut into pieces of a required size are butted at the end edges into a cylindrical shape, and bonded to the soft material M2 on the inside of the main body 11.

Here, the end edges of the core material 28 are butted with the seam allowance 10S of the soft material M2 between them. In this way, the gap between the end edges of the core material 28 is blocked by the seam allowance 10S. Since the seam allowance 10S is opened to the left and right sides of the seam line and overlapped with the material of the soft material M2, the leading end of a sharp object can be received by the seam allowance 10S so as not to stick farther inside.

Second Embodiment

Figure 7:
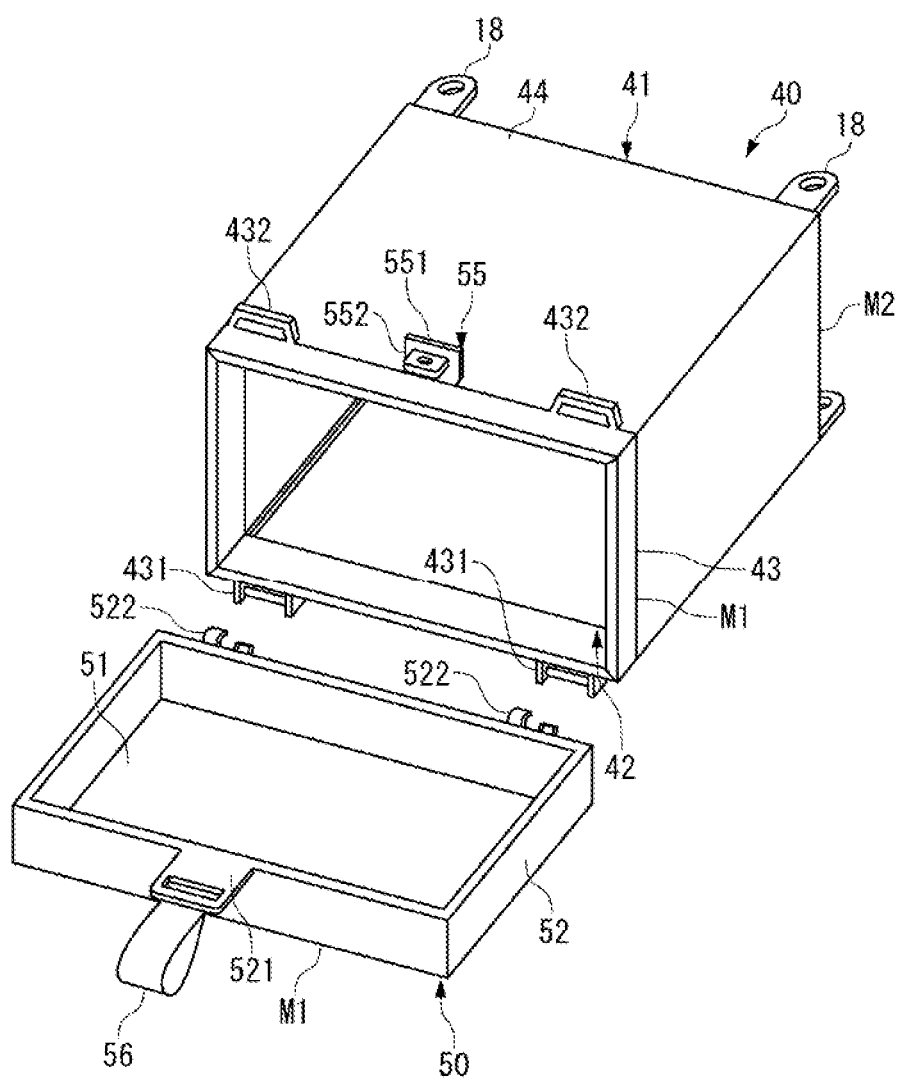
FIG. 7 is a perspective view showing a life jacket case according to a second embodiment.

Next, a life jacket case 40 according to a second embodiment of the present invention will be described with reference to FIG. 7 and FIG. 8.

The second and subsequent embodiments will be described with an emphasis on differences from the first embodiment.

A life jacket case 40 includes a main body 41 having an opening 42, and a cover 50 for opening and closing the opening 42.

The main body 41 includes a peripheral edge 43 which is a rectangular frame surrounding the opening 42, and a housing part 44 which continues to the peripheral edge 43 and houses the life jacket 8.

The cover 50 includes a rectangular cover part 51 for covering the opening 42 and a wall part 52 which stands upright from the four sides of the cover part 51 and is fitted along the outer periphery of the peripheral edge 43.

The peripheral edge 43 of the main body 41 is formed by injection molding. The entire cover 50 is also formed by injection molding. In this embodiment, injection-molded members are used as the hard material M1.

On the other hand, the housing part 44 of the main body 41 is formed of the soft material M2. The same soft material M2 as that of the first embodiment can be used as the soft material M2 of this embodiment.

The peripheral edge 43 is provided with: cover support parts 431 and 431 which rotatably support the cover 50; stoppers 432 and 432 against which the wall part 52 of the cover 50 is butted; and a tag fitting part 55 on which the security tag 30 (FIG. 8A) is fitted.

The cover support parts 431 and 431 are located at the lower side of the peripheral edge 43, and the stoppers 432 and 432 and the tag fitting part 55 are located at the upper side of the peripheral edge 43, although these positions may be reversed.

The stoppers 432 and 432 double as the mounting projections for mounting the life jacket case 40 on the back side of the seat surface 91. The life jacket case 40 is installed in the seat 9 by using the stoppers 432 and the mounting protrusions 18 and 18 provided at the rear end of the housing part 44. At this point, as with the first embodiment, installing the life jacket case 40 at a tilt such that the front end of the life jacket case 40 is on the lower side and the rear end of the life jacket case 40 is on the upper side allows the life jacket 8 to slide down when the cover 50 is opened.

The tag fitting part 55 has a plate 551 standing upward from the peripheral edge 43, and a protrusion 552 protruding forward from the plate 551. The protrusion 552 is formed with a hole for inserting the security tag 30.

The wall part 52 of the cover 50 is provided with a plate 521 facing the tag fitting part 55, and engaging parts 522 and 522 engaging each shaft of the cover support parts 431 and 431.

The plate 521 is formed with a hole for inserting the protrusion 552 of the tag fitting part 55. The plate 521 is provided with a string 56 which is pulled when the life jacket 8 is taken out.

Figure 8A:
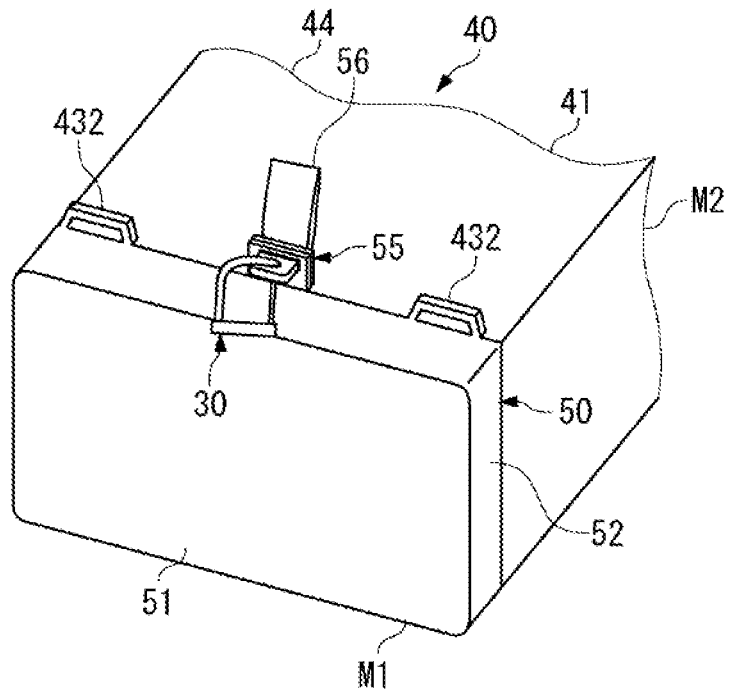
FIG. 8A is a perspective view showing the life jacket case according to the second embodiment.

As shown in FIG. 8A, the cover 50 is fitted along the outer periphery of the peripheral edge 43 and the security tag 30 is fitted on the tag fitting part 55 to thereby engage the cover 50 with the main body 41.

At this point, the wall part 52 of the cover 50 and the peripheral edge 43 face each other across a slight clearance. Thus, the life jacket case 40 is sealed without creating a gap through which a foreign object can be inserted between the wall part 52 and the peripheral edge 43.

Pulling the string 56 forward disengages the security tag 30 from the tag fitting part 55 and opens the cover 50, so that the life jacket 8 can be taken out.

According to this embodiment, it is possible to protect the life jacket 8 by using the hard material M1 for the cover 50 and the peripheral edge 43, which are involved in sealing of the opening 42, as well as to achieve weight reduction by using the soft material M2 for the remaining larger region.

Figure 8B:
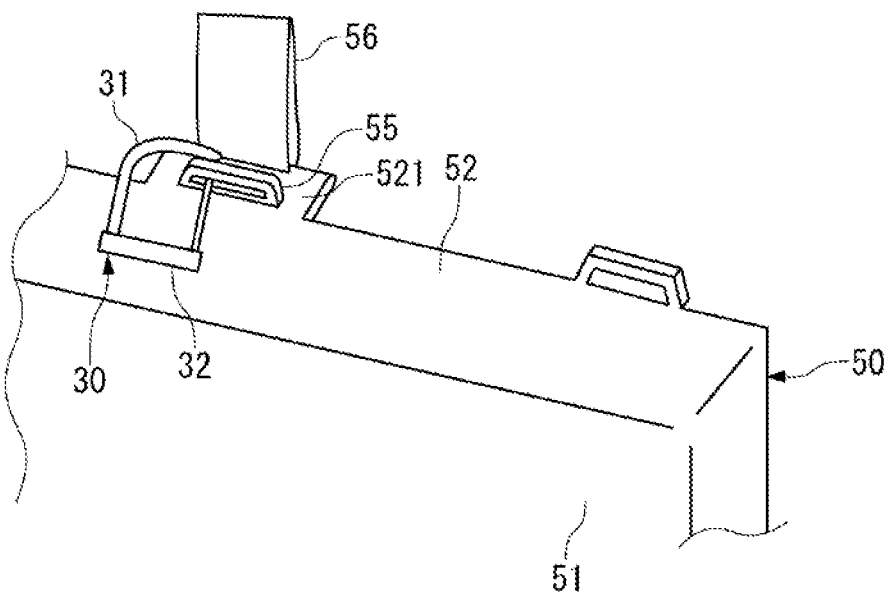
FIG. 8B is a view showing a modified example of the second embodiment.

The tag fitting part 55 and the plate 521 of the cover 50 can also be configured as shown in FIG. 8B. In FIG. 8B, the tag fitting part 55 standing upright from the peripheral edge 43 is passed through the hole of the plate 521, which is horizontally formed on the wall part 52 of the cover 50, to thereby engage the cover 50 with the main body 41.

Third Embodiment

Next, a third embodiment of the present invention will be described with reference to FIGS. 9A, 9B, 10A and 10C.

A life jacket case 60 includes a main body 61 formed in a bag-like shape and a cover 67 for covering a constricted opening 62 of the main body 61.

The main body 61 is formed of the above-described soft material M2, and a folding string 64 is passed through a peripheral edge 63 of the opening 62.

The folding string 64 is passed through the holes provided at regular intervals in the peripheral edge 63, alternately from the front surface to the back surface and from the back surface to the front surface. Pulling the folding string 64 causes the peripheral edge 63 to be accordion-folded, and the opening 62 is constricted and closed.

Figure 9A:
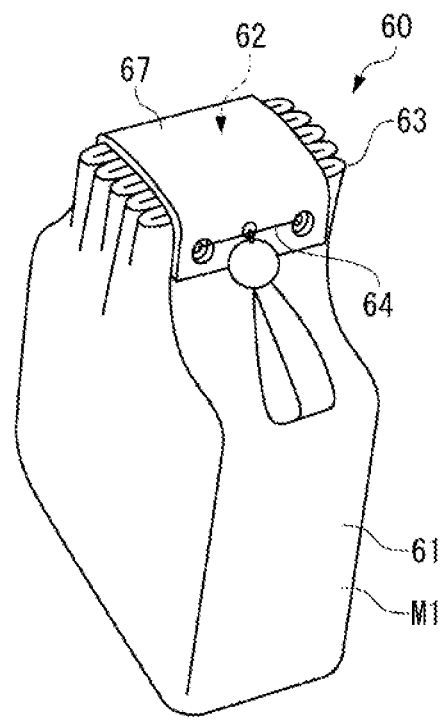
FIG. 9A is a perspective view showing a life jacket case according to a third embodiment.
Figure 9B:
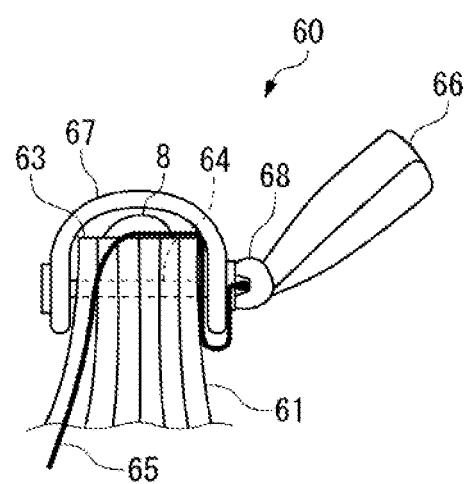
FIG. 9B is a schematic view of the life jacket case of the third embodiment.

As shown in FIG. 9B, the main body 61 is provided with a pull-out string 65 for pulling out the life jacket 8. Description of the configuration of the pull-out string 65 will be omitted, as it is similar to that of the pull-out string 15 of the first embodiment. The pull-out string 65 including the portion hidden behind the main body 61 is indicated by the thick solid line.

A handle 66 is provided through a security tag 68 at the end of the pull-out string 65 extending to the outside of the main body 61.

The cover 67 is formed of the hard material M1. As the hard material M1, a resin plate material is used. The cover 67 is fixed on one end side in the direction in which the pleats of the peripheral edge 63 are aligned, and is engaged on the other end side of the peripheral edge 63 by the security tag 68.

The security tag 68 is a resin part. The security tag 68 is located on the front side of the cover 67 and engages the folding string 64. Pulling the handle 66 snaps the folding string 64 and disengages it from the security tag 68. The security tag 68 thereby indicates whether the life jacket case 60 has been opened.

The life jacket case 60 is mounted on the back side of the seat surface 91 with the opening 62 facing forward.

As shown in FIGS. 9A and 9B, when the life jacket 8 is housed, the opening 62 is closed by the folding string 64 and covered by the cover 67. Thus, even when there is a gap created between the pleats of the peripheral edge 63, the gap is covered by the cover 67 and not exposed to the outside of the life jacket case 60, so that the life jacket case 60 is sealed.

Figure 10A:
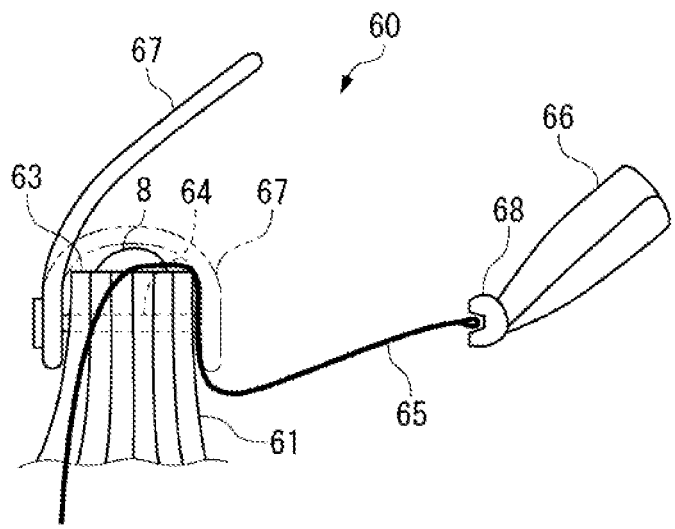
FIGS. 10A and 10B are schematic views illustrating how to use the life jacket case of the third embodiment.
Figure 10B:
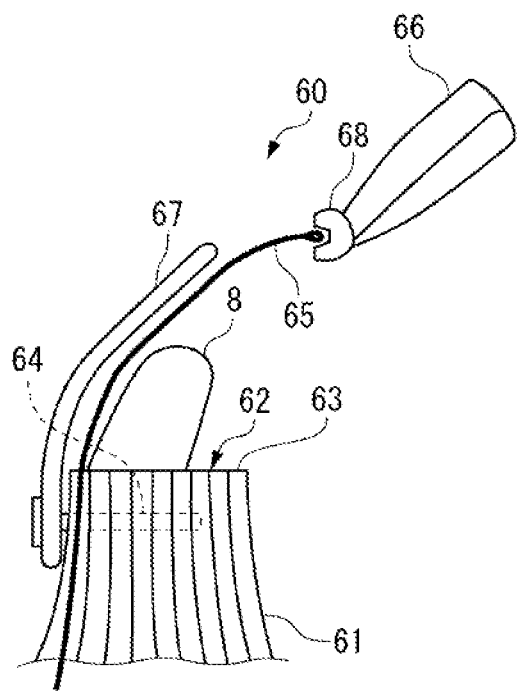

In the event of an emergency, pulling the handle 66 as shown in FIG. 10A snaps the folding string 64 and disengages it from the security tag 68. When the folding string 64 snaps, the cover 67 opens, and the peripheral edge 63 is loosened as shown in FIG. 10B, allowing the life jacket 8 to be taken out from the opening 62.

According to this embodiment, it is possible to protect the life jacket 8 by using the hard material M1 for the cover 67 as well as to achieve weight reduction by using the soft material M2 for the remaining larger region.

Figure 11A:
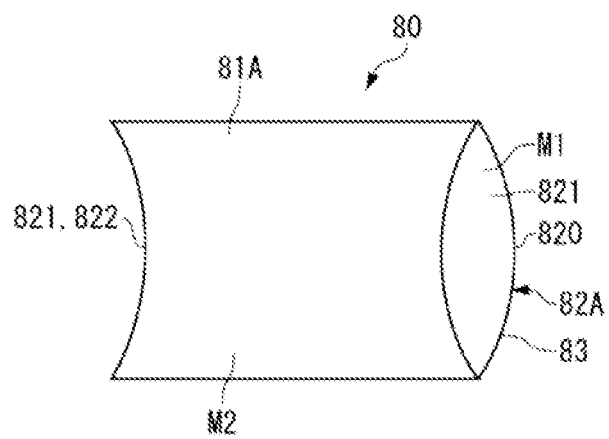
FIG. 11A to 11C are views showing a life jacket case according to a first modified example of the present invention.
Figure 11B:
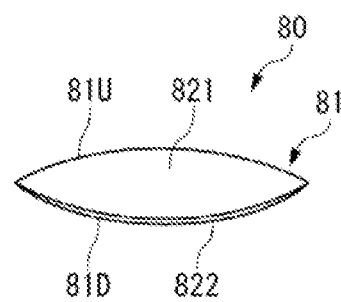
Figure 11C:
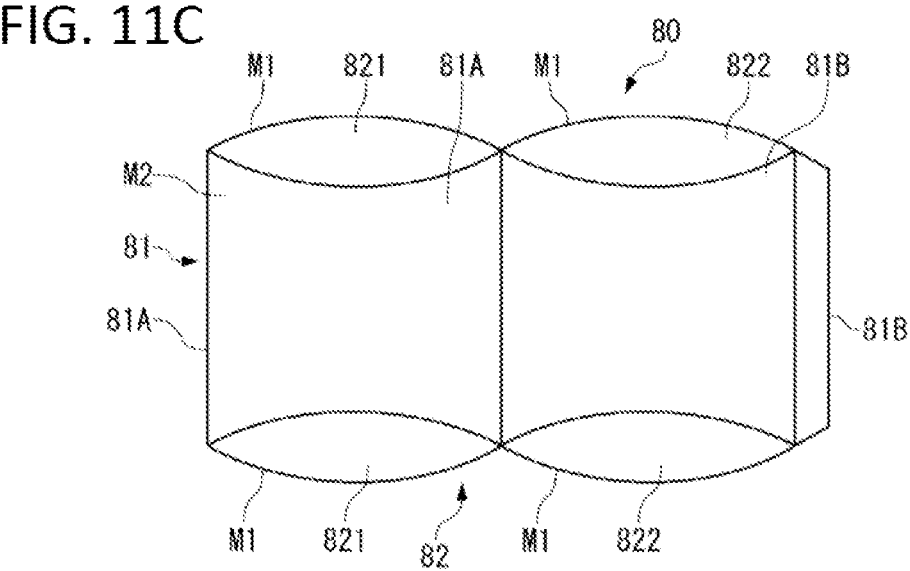

In a first modified example of the present invention shown in FIGS. 11A, 11B and 11C, a cover 82 is constituted of multiple folding pieces 821 and 822 as with the first embodiment.

As shown in the expanded view of FIG. 11C, a life jacket case 80 includes a main body 81 and the cover 82. When an end 81A is bonded on a bonding allowance 81B, the main body 81 assumes a cylindrical shape as shown in FIG. 11B.

The folding pieces 821 and 822 extend from the main body 81 and are folded so as to overlap each other. While the folding pieces 821 and 822 are provided at both ends of the main body 81, the folding pieces 821 and 822 on one end side are used as the cover 82. An arc-shaped end edge 820 (see the right side of FIG. 11A) of the folding pieces 821 and 822 forms a peripheral edge 83 of an opening 82A of the life jacket case 80, and the opening 82A is closed by the folding pieces 821 and 822 being folded (see the left side of FIG. 11A).

At this point, an upper surface 81U and a lower surface 81D of the main body 81 are warped toward the opposite directions into an arc shape in the side view as shown in FIG. 11B. The upper surface 81U and the lower surface 81D are farthest apart from each other at the center in the horizontal direction of the life jacket case 80. On the other hand, as shown in FIG. 11A, the folding pieces 821 and 822 are warped into an arc shape in the plan view.

The hard material M1 is used for the folding pieces 821 and 822. The soft material M2 is used for the other regions.

When folded, the folding pieces 821 and 822 keep their shapes based on the hardness of the hard material M1, so that the opening 82A is sealed without a gap.

According to this modified example, as with the above-described embodiments, it is possible to protect the life jacket 8 by using the hard material M1 for the cover 82 as well as to achieve weight reduction by using the soft material M2 for the remaining region.

Figure 12:
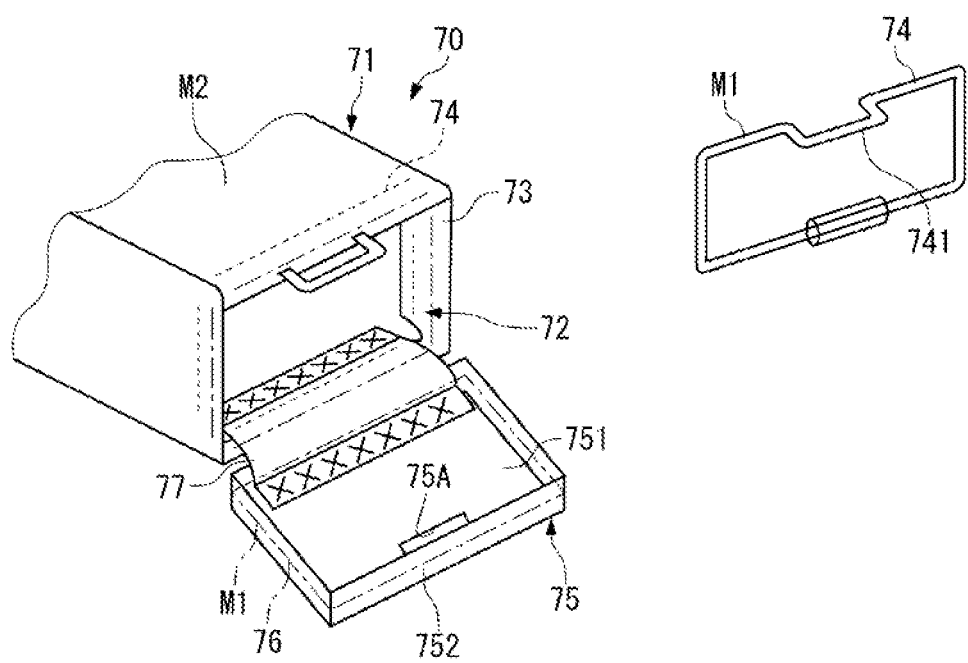
FIG. 12 is a view showing a life jacket case according to a second modified example of the present invention.

In a second modified example shown in FIG. 12, as with the second embodiment, the hard material M1 is used for the peripheral edge of the main body and the cover of the life jacket case.

A life jacket case 70 shown in FIG. 12 includes a main body 71 having an opening 72, and a cover 75.

The main body 71 is formed of the soft material M2 in a bag-like or box-like shape. A peripheral edge 73 forming the rectangular opening 72 of the main body 71 is provided with a resin-molded rectangular frame 74. In this embodiment, resin-molded members are used as the hard material M1.

Here, instead of the resin frame 74, a metal frame formed of a wire, etc. may be used.

The frame 74 is provided with a tag fitting part 741 on which the security tag 30 is fitted. When the frame 74 is mounted on the peripheral edge 73, the tag fitting part 741 protrudes forward from the peripheral edge 73. The tag fitting part 741 is passed through a hole 75A formed in the cover 75. The security tag 30 is fitted on the leading end of the tag fitting part 741 which protrudes from the cover 75.

The cover 75 includes a rectangular cover part 751 for covering the opening 72, and a wall part 752 which stands upright from the four sides of the cover part 751. The wall part 752 is provided with a resin-molded rectangular frame 76. This frame 76 is also used as the hard material M1. Instead of the frame 76, a metal frame may be used.

The cover 75 is mounted on one side of the peripheral edge 73 through a patch 77. The patch 77 is sewn on the peripheral edge 73 and the cover 75.

In this embodiment, the shape of the peripheral edge 73 is kept by the frame 74 which is the hard material M1, while the shape of the outer periphery of the cover 75 is kept by the frame 76 which is also the hard material M1. Thus, when the cover 75 is fitted along the outer periphery of the peripheral edge 73, no gap is created between the cover 75 and the peripheral edge 73.

Therefore, according to this modified example, too, it is possible to protect the life jacket 8 by using the hard material M1 as well as to achieve weight reduction by using the soft material M2 for the remaining region.

Next, a life jacket case 120 according to a third modified example of the present invention will be described with reference to FIG. 13, FIGS. 14A and 14B.

Except for a cover 125, the configuration of the life jacket case 120 is similar to that of the life jacket case 10 of the first embodiment.

Figure 13:
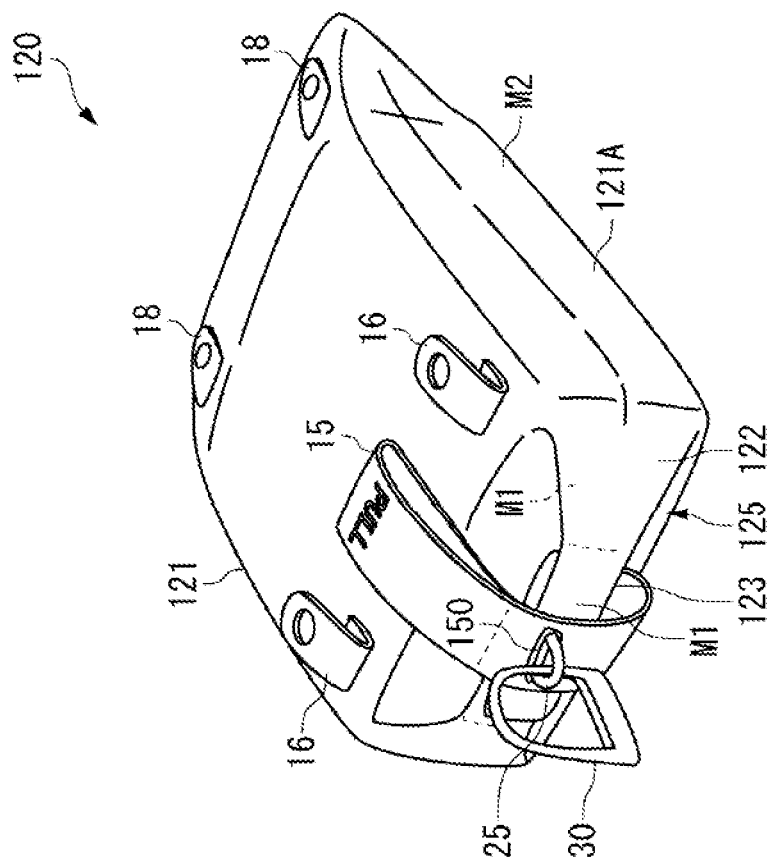
FIG. 13 is a perspective view showing a life jacket case according to a third modified example of the present invention.

As shown in FIG. 13, the life jacket case 120 includes a main body 121 surrounding the life jacket 8, and the cover 125 integrally formed with the main body 121.

The main body 121 is formed of the soft material M2, which is cloth, non-woven fabric, leather, synthetic leather, or the like, into a bag-like shape with a gusset 121A. When the gusset 121A is expanded, the entire life jacket case 120 including the main body 121 is folded up flat as shown in FIG. 14B. Thus, the life jacket case 120 is convenient for keeping in stock and transport.

The main body 121 is provided with the pull-out string 15, the mounting protrusions 16, and the mounting protrusions 18.

The opening 12 (FIG. 14B) is located on one end side of the main body 121. A belt 123 formed of the hard material M1 is sewn on the peripheral edge 13 forming the opening 12. The belt 123 is longer than the width of the main body 121 in its folded-up state, and extends to the outside beyond the end edge on both sides in the width direction of the main body 121.

One end of the belt 123 is provided with the tag fitting part 25. The other end of the belt 123 is formed with a through-hole 123A for inserting the tag fitting part 25.

Figure 14A:
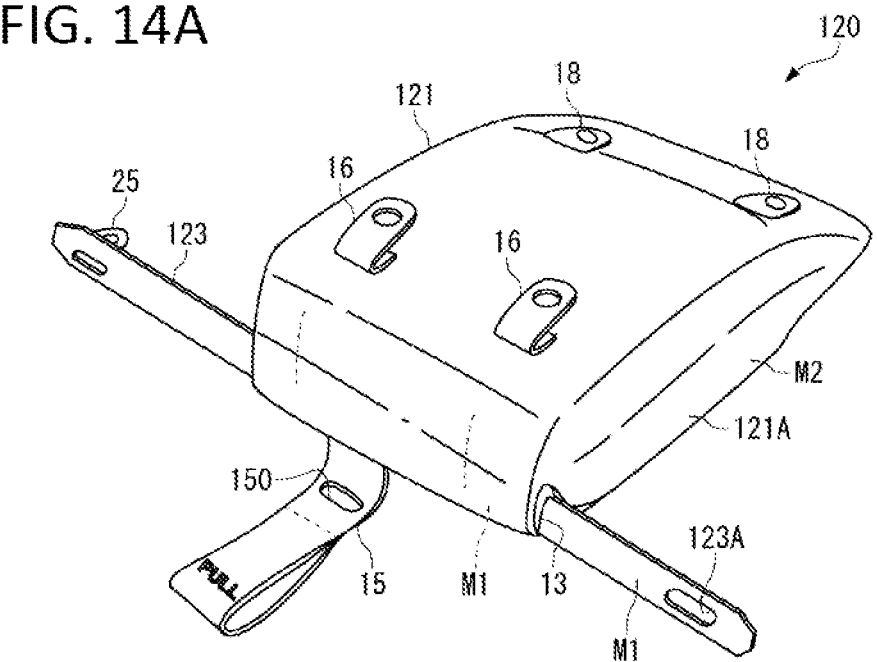
FIG. 14A is a view showing the life jacket case of the third modified example in its state of being opened.
Figure 14B:
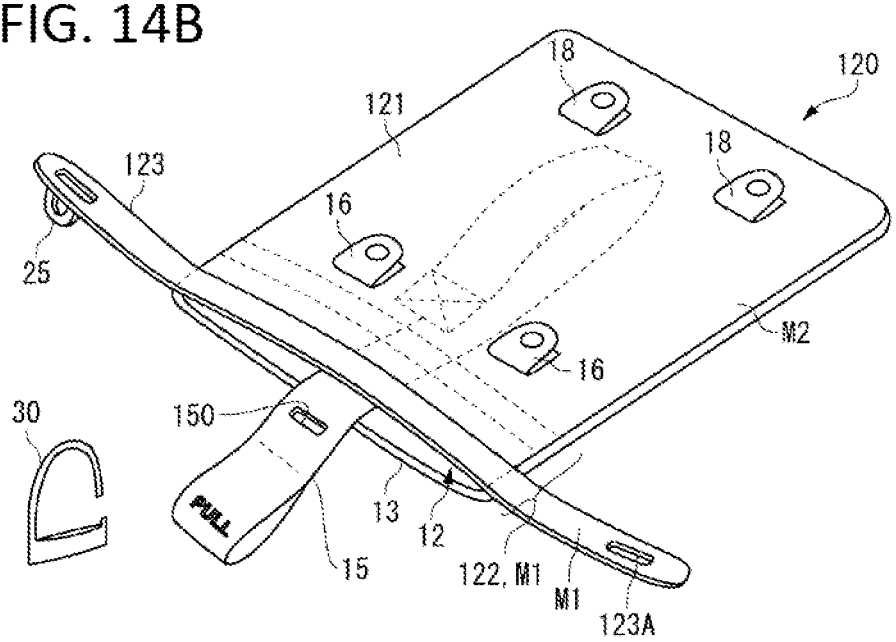
FIG. 14B is a view showing a state where the life jacket case of the third modified example is folded up.

In this modified example, the opening 12 of the life jacket case 120 can be easily sealed as follows:

As shown in FIG. 14A, holding the both end sides of the belt 123, and folding and rolling up the main body 121 near the peripheral edge 13 around the belt 123 as a core closes the opening 12. In this case, the hard material M1 is used integrally with the soft material M2 for a region 122 (FIG. 14B) of the main body 121 which is folded from the back side of the opening 12. The hard material M1 is preferably marked with creases.

Since the hard material M1 is used for the region 122, no gap which allows insertion of a foreign object is created at the folded part of the region 122.

Further, as shown in FIG. 13, one end side of the belt 123 is bent toward the other end side, and the other end side of the belt 123 is bent toward the one end side. This causes the part of the gusset 121A of the main body 121 to follow the belt 123 and be folded over the rolled-up part of the region 122.

Then, the tag fitting part 25 is passed through the through-hole 123A to thereby connect the both ends of the belt 123. Thus, the region 122 is maintained in its rolled-up state. Further, the tag fitting part 25 is passed through the through-hole 150 formed in the pull-out string 15 before the security tag 30 is fitted on the tag fitting part 25.

In this modified example, the cover 125 (FIG. 13) is constituted of the region 122 of the main body 121 which is folded from the back side of the opening 12 so as to be rolled up in multiple layers, and the belt 123 which is overlapped with the region 122. The opening 12 is sealed without a gap and in a state which makes it difficult to pry out, on the inner side of the belt 123 and the folded region 122. The region 122 is also folded from the lateral sides (from the sides of the gusset 121A) after being rolled up. Moreover, unless the security tag 30 is disengaged and the connection of the belt 123 is released, one cannot expand the region 122 to access the opening 12.

As described above, the life jacket case 120 can also prevent access to the life jacket 8 from the outside.

In addition, since the use of the hard material M1 is confined to the cover 125, weight reduction of the life jacket case 120 can be realized.

The same materials as those given as examples in the first embodiment can be used as the hard material M1 of this modified example.

The hard material M1 used for the belt 123 and the hard material M1 used for the main body 121 may or may not be the same.

In addition to the above-described examples, the configurations introduced in the above embodiments may be arbitrarily selected or appropriately changed into another configuration, as long as such a change is made within the scope of the present invention.

What is claimed is:

1. A life jacket case for housing a life jacket, the life jacket case including:
   a main body defining an opening through which the life jacket is taken in and out;
   a cover for opening and closing the opening, the cover comprising two or more folding pieces that extend from the main body and are folded inward relative to the main body to close the opening, each folding piece being folded inward at a joint of the main body and the folding piece, and
   a tag fitting part on which a security tag is fitted, the security tag indicating whether or not the cover has been opened,
   wherein the cover is made of a first material and a region of the life jacket case other than or larger than the cover is made of a second material,
   wherein the second material is more lightweight than the first material and the first material is stiffer than the second material,
   wherein the opening is closed by the two or more folding pieces being overlapped such that the cover blocks the entire opening,
   wherein the tag fitting part is fixed on one of the folding pieces such that the tag fitting part extends from a surface of the one of the folding pieces and passes through the another one of the folding pieces, and
   wherein the security tag is fitted on a portion of the tag fitting part that protrudes from the other of the folding pieces.

2. The life jacket case according to claim 1, wherein the cover comprises four folding pieces, which are folded from four sides, into a rectangular shape.

3. The life jacket case according to claim 1, wherein expanding the folding pieces allows the life jacket case to be folded up flat.

4. The life jacket case according to claim 1, wherein a plate material marked with creases for the folding pieces is used as the first material.

5. The life jacket case according to claim 4, wherein
   the second material is used for a region including the cover, and
   the first material is integrated with the second material.

6. The life jacket case according to claim 1, wherein
   the life jacket case further comprises a pull-out string for pulling the life jacket out of the life jacket case, and
   the pull-out string comprises:
   a fixed part which is fixed on the life jacket case;
   a turn-around part which continues to the fixed part and at which the extension direction of the pull-out string is changed inside the life jacket case to a pull-out direction in which the pull-out string is pulled out; and
   a grip part extending to the outside of the life jacket case.

7. The life jacket case according to claim 6, wherein the life jacket case further comprises a guide part which guides the pull-out string along the pull-out direction between the turn-around part and the grip part.

8. The life jacket case according to claim 1, wherein
   a memeber molded from a resin is used as the first material, and
   the first material is also used for the peripheral edge of the opening.

9. The life jacket case according to claim 1, wherein the life jacket case is installed in an aircraft seat or near the aircraft seat.

10. An aircraft comprising the life jacket case according to claim 1.

11. The life jacket case according to claim 1, the life jacket case further comprising: a string for pulling the life jacket out of the life jacket case, wherein the security tag is detached from the life jacket case as the security tag is pulled.

12. The life jacket case according to claim 11, wherein it is determined that the cover has been opened when the security tag is detached from the life jacket case.

13. The life jacket case according to claim 1, wherein: the life jacket case further comprises a pull-out string for pulling the life jacket out of the life jacket case, and
   when the pull-out string is pulled, the cover is pushed open from the inside of the life jacket case by the life jacket following the pull-out string.

14. The life jacket case according to claim 1, wherein the life jacket case further comprises a pull-out string for pulling the life jacket out of the life jacket case, and
   the pull-out string is set between an outer periphery of the life jacket and an inner surface of the life jacket case.

15. The life jacket case according to claim 1, wherein the life jacket case further comprises a pull-out string for pulling the life jacket out of the life jacket case, said pull-out string comprising a through-hole, and
   wherein the tag-fitting part of the life jacket case is adapted to interlock with the through-hole of the pull-out string when the opening of the life jacket case is closed.

16. The life jacket case according to claim 1, wherein the main body includes:
   a first side part,
   a second side part,
   a third side part connecting one end of the first side part and one end of the second side part, and
   a fourth side part connecting another end of the first side part and another end of the second side part,
   wherein the first side part, second side part, third side part, and fourth side part collectively define the opening of the main body.

17. The life jacket case according to claim 16, wherein the two or more folding pieces of the cover comprises:
   a first folding piece that is folded inward from the first side part of the main body toward the second side part of the main body, and
   a second folding piece that is folded inward from the second side part of the main body toward the first side part of the main body,
   wherein the tag fitting part is fixed on the first folding piece such that the tag fitting part extends from the first folding piece and passes through the second folding piece.

18. The life jacket case according to claim 17, wherein the tag fitting part is fixed on the first folding piece such that the tag fitting part extends from an outer surface of the first folding piece, the outer surface facing away from the opening.

19. A life jacket case for housing a life jacket, the life jacket case including:
- a main body defining an opening through which the life jacket is taken in and out;
- a cover for opening and closing the opening, the cover comprising two or more folding pieces that extend from the main body and are folded inward relative to the main body to close the opening, each folding piece being folded inward at a joint of the main body and the folding piece, and
- a tag fitting part on which a security tag is fitted, the security tag indicating whether or not the cover has been opened,
- wherein the opening is closed by the two or more folding pieces being overlapped such that the cover blocks the entire opening,
- wherein the tag fitting part is fixed on one of the folding pieces such that the tag fitting part extends from a surface of the one of the folding pieces and passes through the another one of the folding pieces, and
- wherein the security tag is fitted on a portion of the tag fitting part that protrudes from the other of the folding pieces.

* * * * *